I. P. Richards,

Punching Metal.

No. 4228. Reissued Jan. 3. 1871.

Witnesses.

S. N. Piper

L. N. Miller

Isaac P. Richards.

by his attorney.

N. W. Edy

N. PETERS, PHOTO-LITHOGRAPHER, WASHINGTON, D. C.

United States Patent Office.

ISAAC P. RICHARDS, OF WHITINSVILLE, MASSACHUSETTS.

Letters Patent No. 104,769, dated June 28, 1870; reissue No. 4,228, dated January 3, 1871.

IMPROVEMENT IN PUNCHES.

The Schedule referred to in these Letters Patent and making part of the same.

*To all persons to whom these presents may come:*

Be it known that I, ISAAC P. RICHARDS, of Whitinsville, in the county of Worcester and State of Massachusetts, have made a new and useful invention having reference to Punches; and do hereby declare the same to be fully described in the following specification and represented in the accompanying drawing making part thereof.

Of such drawing—

Figure 1:
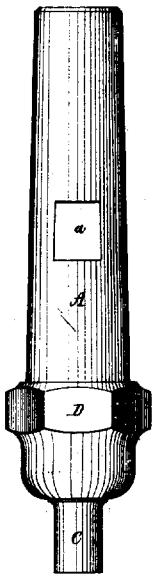

Figure 1 is a side elevation of the punch, its stock, and their connection-coupling nut, without the guide-teat to be hereinafter described.

Figure 2:
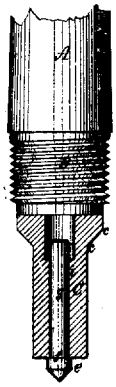

Figure 2 exhibits the said guide-teat, a longitudinal and axial section of the separable punch, and an elevation of the lower part of its stock.

Figure 3:
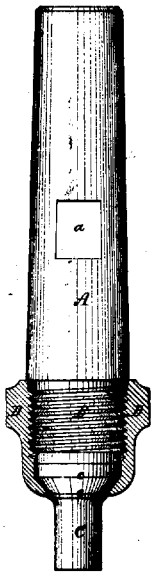

Figure 3 exhibits a longitudinal section of the coupling-nut and elevations or side views of the separable punch and stock, the said nut, punch, and stock being shown, as in such figures, coupled together.

Figure 4:
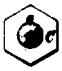

Figure 4 is a lower end view of the punch and the guide-teat.

In figs. 1, 2, and 3, A denotes the punch-stock, which is to be formed to fit to the hole or socket designed to receive it in the lever or drop of a power or stamping-press.

Such stock may be provided with a seat or bearing, *a*, to receive the terminus of the clamp-screw when employed to hold the stock in a press, as mentioned.

The stock at and near its lower end is furnished with a male-screw, B, to receive a coupling-nut, D, having the form as represented in fig. 3, such nut being constructed with a female screw, to engage with the screw B.

C represents the punch. Its face or working end or part may be of any proper form or figure, to adapt it to the punching from sheet metal, nuts, washers, or blanks, as used by manufacturers or others, particularly in the fabrication of jewelry.

A convenient way to construct the punch is to take a piece of steel of suitable dimensions, and drill or bore a hole, *i*, axially through it. This having been done, the piece of metal, in case the punch is to have a circular face, should be properly arranged upon and fixed to a lathe-arbor and be turned so as to produce a working end with such a face. In case the working end is to be prismatic, with polygonal face, a planer, or other proper means well known to mechanics, may be employed to produce it.

The punch near its upper end is provided with a beveled shoulder, *c c*, which may be arranged as shown in figs. 2 and 3.

The coupling-nut D is to be formed to embrace the shoulder in a manner to hold the punch firmly up to the lower end of the stock when the said nut is screwed upon the screw B, to the extent to carry the punch into close contact with the stock.

For punching with reference to a hole made in a plate, as, for instance, for the making of a nut or a washer, a central teat, *e*, becomes necessary, it being formed with a shoulder, *f*, and a shank, *g*, arranged in manner as represented.

The shank goes into the axial hole *i* of the punch, until the shoulder brings up against the face or lower end of the punch.

The upper portion of the punch-hole or passage *i*, may be somewhat larger in diameter than the rest of the hole, in order to facilitate the removal of the teat-shank from the punch.

The object of making the punch with the hole or passage carried entirely through it, is to render it easy to expel the teat-shank from the punch-hole by an instrument introduced therein whenever the teat-shank may have become so strongly set into the hole as to render difficult, if not impossible, the separation of the two by the fingers of a person's hand applied to the teat.

In punches which have the teat in one piece with the punch, it becomes a difficult matter to repair the punch when it may be necessary so to do, as it cannot conveniently be effected without drawing the temper of the punch, preparatory to refacing it, a subsequent hardening of it being requisite.

With the separable teat, it will only be necessary to withdraw the teat or expel it from its socket in the punch, in order to render the punch available for being ground or refaced on a grindstone, or by means of a proper grinder.

I am aware of the punch as described in Letters Patent No. 49,937, granted September 12, 1865, to Daniel T. Walker, and make no claim to any part thereof, or any arrangement or combination of parts as shown in such punch or patent, there being important and useful differences between the said punch of the said Walker and the punch invented by me, herein described.

With my stock and coupling and mode of making the punch, the latter may be set firmly up to the stock, or punches of variable sizes may be used.

The conical shoulder enables the coupling-nut to readily adapt itself to the punch, so as to hold it firmly against the stock when the nut is screwed up, such being a matter of much importance.

Furthermore, by means of the conical shoulder *c c*, and the contiguous surrounding conical part of the nut, the punch becomes properly centered relatively to the stock.

What, therefore, I claim as my invention, and desire to have secured to me by Letters Patent, is as follows:

1. The combination of the separable teat, made with a shoulder and shank, as described, with the separable punch having a teat-shank socket or hole going entirely through it axially, as specified.

2. The combination of the separable teat, having a shoulder and shank, as described, and the separable punch having the shoulder *c c*, and the teat-shank passage going entirely through it, as set forth, with the screw-coupling nut D, the shank A, and its screw B, all being as explained.

ISAAC P. RICHARDS.

Witnesses:
R. H. EDDY,
S. N. PIPER.